(12) United States Patent
de Garrido et al.

(10) Patent No.: US 7,663,701 B2
(45) Date of Patent: Feb. 16, 2010

(54) SYSTEMS, METHODS, AND APPARATUS FOR NOISE REDUCTION

(75) Inventors: Diego P. de Garrido, Newtown, PA (US); Paul Gehman, Doylestown, PA (US); Jon McAllister, Philadelphia, PA (US)

(73) Assignee: ATI Technologies, Inc., Markham (CA)

( * ) Notice: Subject to any disclaimer, the term of this patent is extended or adjusted under 35 U.S.C. 154(b) by 729 days.

(21) Appl. No.: 11/279,243

(22) Filed: Apr. 10, 2006

(65) Prior Publication Data

US 2007/0019114 A1 Jan. 25, 2007

Related U.S. Application Data

(60) Provisional application No. 60/669,878, filed on Apr. 11, 2005.

(51) Int. Cl.
*H04N 5/00* (2006.01)
(52) U.S. Cl. ............................ 348/620; 348/618
(58) Field of Classification Search ................ 348/607, 348/624, 452, 533, 701, 699, 619, 620, 621; 375/240.24, 240.12–240.16; 382/254, 274
See application file for complete search history.

(56) References Cited

U.S. PATENT DOCUMENTS

| | | | |
|---|---|---|---|
| 5,361,102 A | 11/1994 | Roy | |
| 5,929,902 A | 7/1999 | Kwok | |
| 6,122,314 A | 9/2000 | Bruls | |
| 6,657,676 B1 | 12/2003 | Borneo | |
| 6,678,330 B1* | 1/2004 | Kondo et al. | 375/240.24 |
| 6,724,433 B1 | 4/2004 | Lippman | |
| 6,867,814 B2 | 3/2005 | Adams | |
| 7,418,149 B2* | 8/2008 | Dinh et al. | 382/254 |
| 2004/0130619 A1 | 7/2004 | Lin | |
| 2005/0105627 A1 | 5/2005 | Sun | |
| 2005/0140828 A1 | 6/2005 | Patel | |

OTHER PUBLICATIONS

G. de Haan et al. Television noise reduction IC. IEEE Trans. Cons. Electr., v.44, pp. 143-154, 1998. 12pp.

E. Dubois. The sampling and reconstruction of time-varying imagery with application in video systems. Proc. IEEE, v.73, n. 4, Apr. 1985, pp. 502-523.

E. Dubois et al. Noise reduction in image sequences using motion-compensated temporal filtering. IEEE Trans. Comm., v.COM-32, n.7, Jul. 1984, pp. 826-831.

E. Dubois et al. Estimation of 2-D motion fields from image sequences with application to motion-compensated processing. 35pp. Motion Analysis and Image Sequence Processing, ch.3, Kluwer, 1993.

R. Kleihorst. Noise filtering of image sequences. Ph.D thesis, Delft Univ., 1994. 161pp.

R. Lagendijk et al. 3.11: Video enhancement and restoration. Handbook of Image and Video Processing. pp. 1-22. Academic Press, 2005.

(Continued)

*Primary Examiner*—M. Lee
(74) *Attorney, Agent, or Firm*—Hartman Patents PLLC

(57) ABSTRACT

Systems, methods, and apparatus for noise reduction include noise estimation from blanking interval information. Such systems, methods, and apparatus may also include temporal filtering, scene change detection, inverse telecine, and/or DC preservation.

36 Claims, 16 Drawing Sheets

OTHER PUBLICATIONS

H. Zheng. Estimation of image motion in scenes containing multiple moving objects. Ph.D. thesis, Queen's Univ., 1995. 119pp.

A. Amer et al. A new video noise reduction algorithm using spatial subbands. Intl. Conf. Electr. Circ. Syst., ICECS 96. 5pp.

A. Borneo et al. An innovative adaptive noise reduction filter for moving pictures based on modified Duncan range test. St J. Syst. Research, No. 0, 2000, pp. 14-22.

G. de Haan et al. Automatic 2-D and 3-D noise filtering for high-quality television receivers. Proc. 7th Intl. Wkshp. HDTV, 1994, pp. 221-230. 10pp.

Microvideo Ltd. VBI information. Cambridge, UK. 1p., 2003.

* cited by examiner

```
s_delta = s_max - s_min;
s_mid = (s_min + s_max) / 2;
thresh_lo = s_min + s_delta / 4;
thresh_hi = s_min + 3 * s_delta / 4;
status = IN_TROUGH;
peak = 0;
i = 0;
while (peak != 7)
{
   if (status == ENTERING_PEAK)
   {
       if (pucLine[i] >= thresh_hi) status = IN_PEAK;
   }
   else if (status == IN_PEAK)
   {
       if (pucLine[i] <= s_mid) status =
ENTERING_TROUGH;
   }
   else if (status == ENTERING_TROUGH)
   {
       if (pucLine[i] <= thresh_lo) status =
IN_TROUGH;
    }
   else if (status == IN_TROUGH)
   {
       if (pucLine[i] >= s_mid)
      {
          status = ENTERING_PEAK;
          wave[peak] = i;
          peak += 1;
      }
   } i += 1;
   if (i == num_samples)
   {
        ERROR: Failure to detect Run In.
   }
}
```

FIG. 10

```
start_bit2_idx = (wave[ 6] << INDEX_FRAC_BITS) + 3 * period;
begin = (start_bit2_idx - (3 * period / 8)) >> INDEX_FRAC_BITS;
end = (start_bit2_idx + (3 * period / 8)) >> INDEX_FRAC_BITS;
num_start_bit_samples = begin - end + 1;
average = 0;
for (i = begin; i <= end; i += 1)
{
    average += sample[ i] ;
}
average = (average << CALC_FRAC_BITS) / num_start_bit_samples;
variance_squared = 0;
for (i = begin; i <= end; i += 1)
{
    diff = (sample[ i] << CALC_FRAC_BITS) - average;
    variance_squared += (diff * diff) >> CALC_FRAC_BITS;
}
variance_squared /= num_samples;
```

FIG. 11

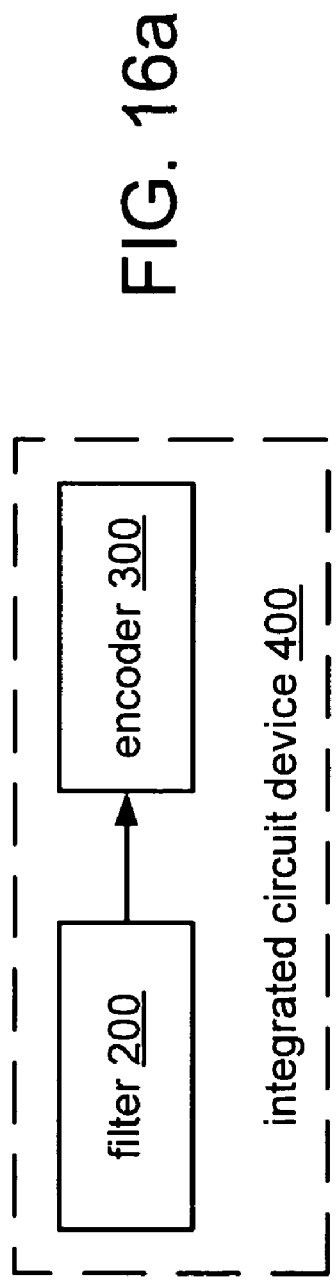
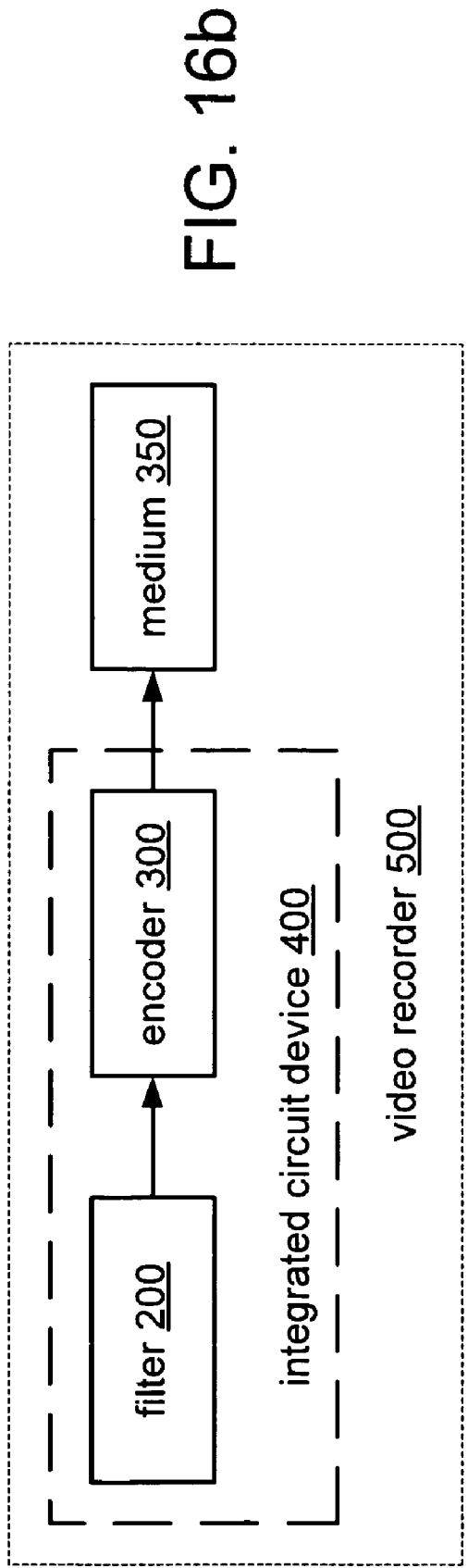

SYSTEMS, METHODS, AND APPARATUS FOR NOISE REDUCTION

RELATED APPLICATIONS

This application claims benefit of U.S. Provisional Pat. Appl. No. 60/669,878, entitled "SYSTEMS, METHODS, AND APPARATUS FOR NOISE REDUCTION," filed Apr. 11, 2005.

FIELD OF THE INVENTION

This invention relates to signal processing.

BACKGROUND

Random noise can be a major impairment in video signals. Such noise may degrade video quality and subsequent video coding operations. Potential benefits of noise reduction algorithms include improving visual quality by removing noise from the video. Such benefits also include enabling better coding or compression of video signals, since bits may be used to code the signal itself rather than to code the noise.

SUMMARY

In one embodiment, a method of processing a video signal includes obtaining a predicted pixel value according to a motion vector and a location of a first pixel value of the video signal; and calculating a second pixel value based on the first pixel value, the predicted pixel value, and a weighting factor. The method also includes estimating a noise statistic of the video signal according to a known signal content of the video signal. In this method, the weighting factor is based on the estimated noise statistic.

In another embodiment, an apparatus includes a motion compensator configured to produce a predicted pixel value according to a motion vector and a location of a first pixel value of a video signal; a pixel value calculator configured to calculate a second pixel value based on the first pixel value, the predicted pixel value, and a weighting factor; a noise estimator configured to estimate a noise statistic of the video signal according to a known signal content of the video signal; and a weighting factor calculator configured to calculate the weighting factor based on the estimated noise statistic.

In another embodiment, an apparatus includes means for obtaining a predicted pixel value according to a motion vector and a location of a first pixel value of the video signal; means for calculating a second pixel value based on the first pixel value, the predicted pixel value, and a weighting factor; means for estimating a noise statistic of the video signal according to a known signal content of the video signal; and means for calculating the weighting factor based on the estimated noise statistic.

BRIEF DESCRIPTION OF THE DRAWINGS

FIGS. 10 and 11 show examples of pseudo-code sequences.

FIG. 16a shows a block diagram of an integrated circuit device 400 according to an embodiment.

FIG. 16b shows a block diagram of a video recorder 500 according to an embodiment.

DETAILED DESCRIPTION

A noise reduction algorithm may be implemented to use motion information. One technique of noise reduction uses motion-adaptive filtering to average all or part of the current video frame with corresponding portions of one or more other frames. In such a technique, temporal filtering may be suspended for a portion of the current frame which differs by more than a threshold value from a corresponding portion of another frame. Another technique of noise reduction uses motion compensation to average all or part of the current video frame with corresponding portions of one or more predicted frames.

Sources of noise may include radio-frequency (RF) noise, jitter, and picture noise such as film grain. The RF noise typically has a Gaussian distribution. It may be desirable to remove effects of RF noise form a video signal without unduly affecting aesthetic features such as film grain noise.

Methods according to embodiments of the invention use information in addition to motion information for noise reduction. Such additional information may include dynamics of video sequences such as scene change (a transition between levels of video complexity) and a distinction between film and video modes (film is progressive and video is interlaced, which may affect the type of motion search performed). Such methods may also include noise estimation based on, for example, information from vertical blanking interval (VBI) lines in video frames. The vertical blanking interval may include deterministic signals, such as closed captioning (CC) timing data, that can be used to estimate noise power. A noise reduction method may also include preservation of local direct-current (DC) level, as changes of the local DC level may be expected to generate artifacts in the video frame.

Figure 1:
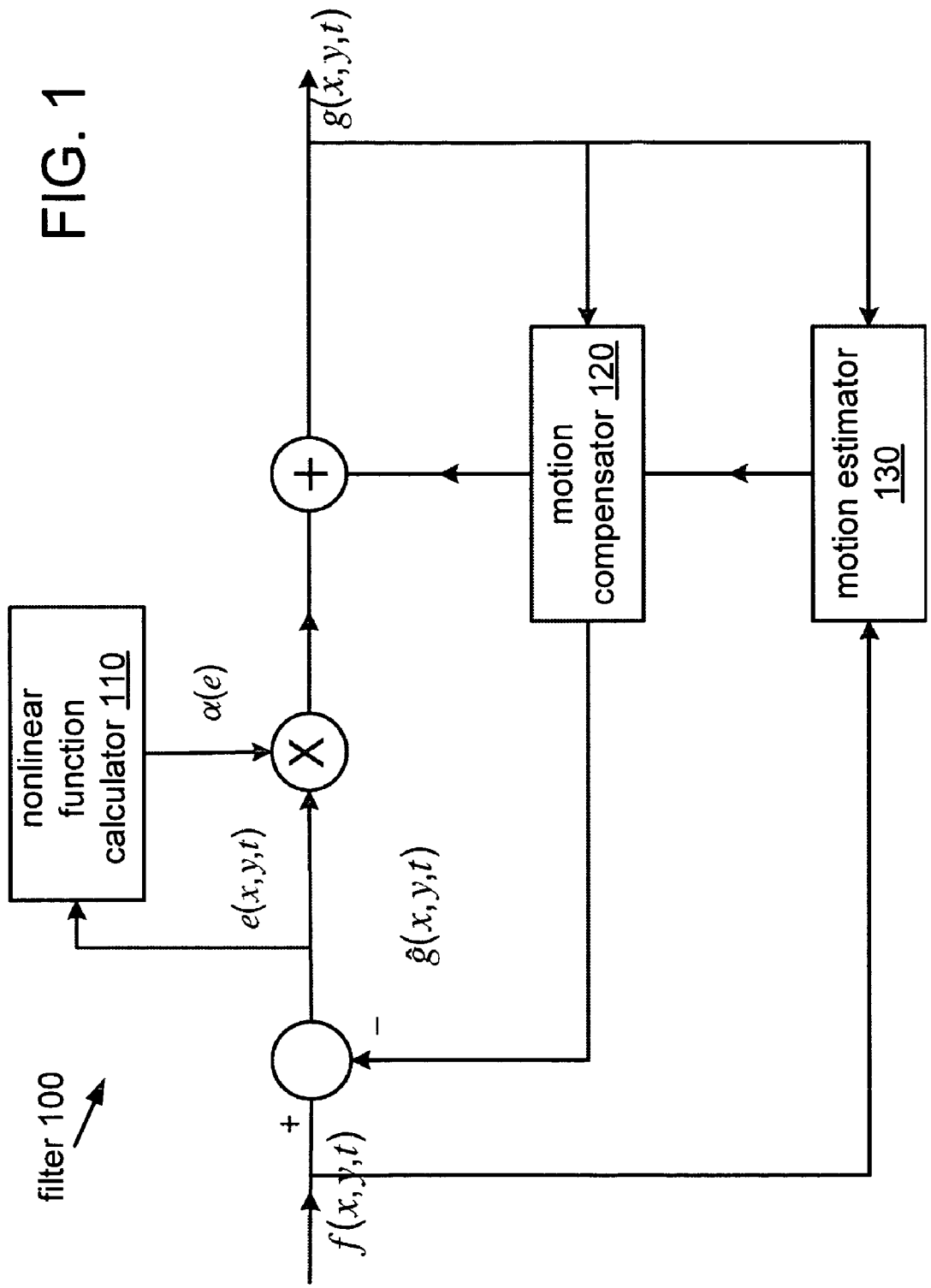
FIG. 1 shows a block diagram of a motion-compensated temporal filter 100.

FIG. 1 shows a block diagram of a first-order recursive temporal filter 100 with motion compensation. Filter 100 includes a nonlinear function calculator 110, a motion compensator 120 configured to perform block motion compensation, and a motion estimator 130 configured to perform block motion estimation. A basic operation of the filter may be expressed as follows:

$$g(x,y,t) = (1-\alpha)\hat{g}(x,y,t) + \alpha f(x,y,t), \quad (1)$$

where f(x, y, t) denotes pixel intensity of the input frame, with the triplet (x, y, t) denoting spatial-temporal coordinates. The signal g(x, y, t) is the output filtered frame, $\hat{g}(x,y,t)$ is the motion compensated frame, and the weighting factor $\alpha$ is a constant (e.g. $0 \leq \alpha \leq 1.0$).

One potential advantage of a recursive scheme (e.g., a first-order infinite-impulse-response filter as described by expression (1) above) as compared to a finite-impulse-response filter is a higher ratio between noise attenuation and storage area required. Embodiments may also be configured for application to higher-order filters.

In the case of ideal motion compensation, the motion compensated frame $\hat{g}(x,y,t)$ relates to the previous frame as follows:

$$\hat{g}(x,y,t) = g(x-v_x, y-v_y, t-T) \quad (2)$$

where $(v_x,v_y)$ denotes the motion vectors associated to each pixel and T is the sampling interval. Higher-order implementations of a temporal filter as described above may be configured to compute the output frame based on motion compensated frames relating to one or more other frames as well.

A prediction error e(x, y, t) may be defined as equal to the difference $f(x, y, t) - g(x-v_x, y-v_y, t-T)$, which we will assume to be small. Note that this is not always true. For example, the model described above does not take into account occlusion of objects, fades, dissolves and scene changes. Such events may prevent a feature present in one frame from being present at any location in another frame. However, it provides a tractable mathematical model, and further embodiments include methods that take such features into account. Embodiments may also be applied to other models of $\hat{g}(x, y, t)$ that are based on more than one previous frame and/or on one or more future frames. For example, such a model may be bidirectional in time.

Figure 2:
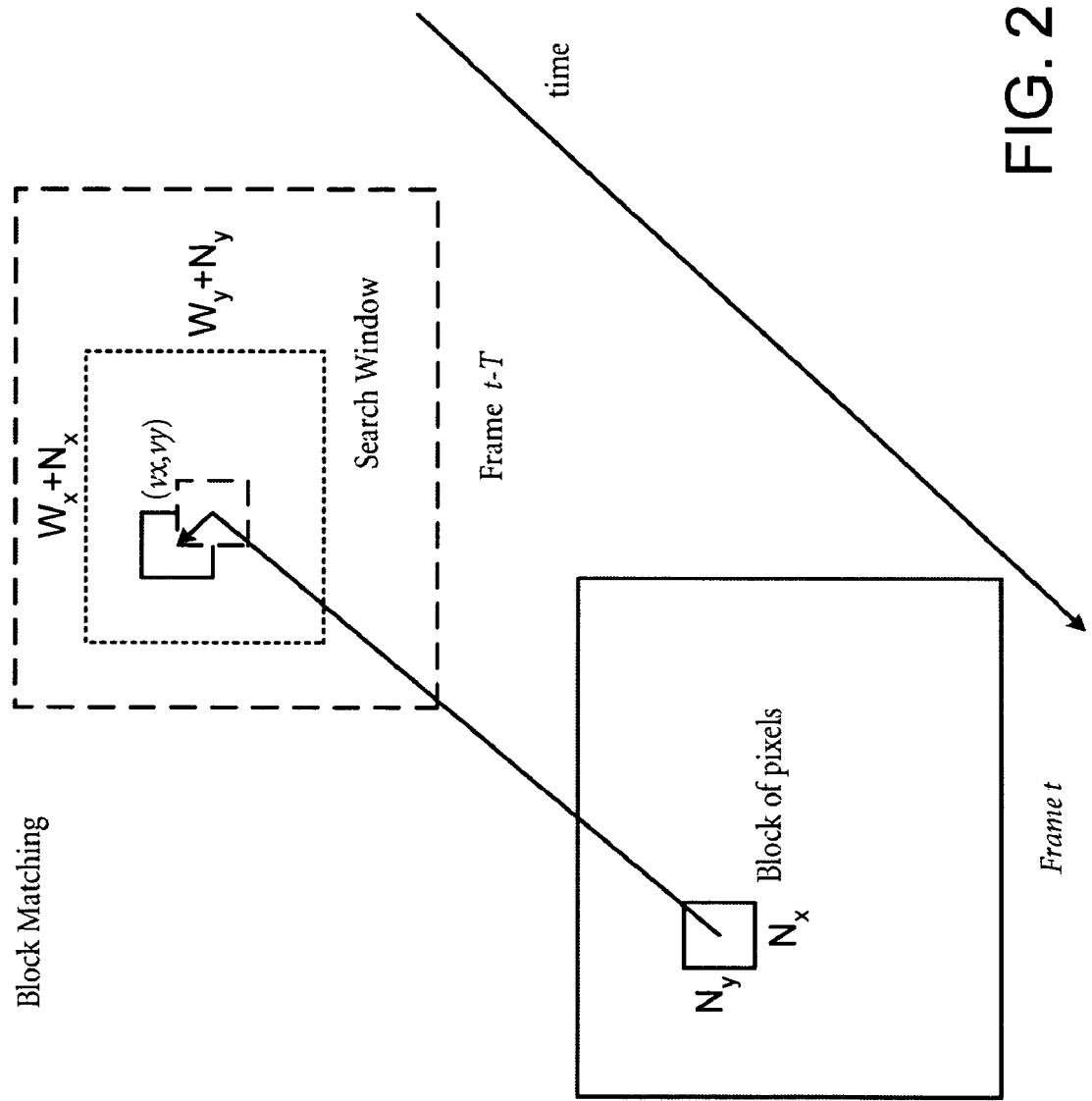
FIG. 2 shows a diagram of block matching.

Estimating the motion vectors $(v_x,v_y)$ can be done using any number of algorithms which are known or may be developed in the field. One example of a full-search block matching algorithm for motion estimation is illustrated in FIG. 2, where the displacement for a pixel (x,y) in frame t (e.g., the current frame) is determined by considering an $N_x \times N_y$ block N that is centered about (x,y), and searching frame t−T (e.g., the reference frame) for location of the best-matching block of the same size. The search may be limited to an $(N_x+W_x) \times (N_y+W_y)$ region W that is called the search window and, in the case of a full search, may be done exhaustively over the selected window W. In some applications, a motion estimation engine (e.g. a dedicated array of logic elements such as an embedded core) is used to estimate the motion vectors. Embodiments may be configured for application to any motion estimation scheme (e.g., pixel-based, block-based, region-based).

One block matching criterion that may be used is the sum of absolute error difference (SAD). In one example, SAD $(v_x,v_y)$ is equal to $$\sum_{(x,y)\in N} |f(x, y, t) - g(x-v_x, y-v_y, t-T)|, \quad (3)$$

where the current frame is the one to be noise reduced f(x, y, t) and the reference frame is the previously noise-reduced $g(x-v_x, y-v_y, t-T)$. Then the motion vector $(v_x,v_y)$ may be defined as arg min $SAD(v_x, v_y)$. $(v_x,v_y)$ Another block matching criterion that may be used is the sum of squared error (SSE). In one example, $SSE(v_x,v_y)$ is equal to $$\sum_{(x,y)\in N} (f(x, y, t) - g(x-v_x, y-v_y, t-T))^2, \quad (3)$$

in which case the motion vector $(v_x,v_y)$ may be defined as arg min $SSE(v_x, v_y)$. $(v_x,v_y)$ The reference frame may be interpolated. Potential advantages of interpolation include better accuracy in the motion estimation and consequently a decreased prediction error. Interpolation may be performed according to several methods. The following example describes an interpolation by a factor of 2, enabling half-pel motion estimation and compensation. Another typical example includes interpolation by a factor of 4 (quarter-pel interpolation).

Figure 3:
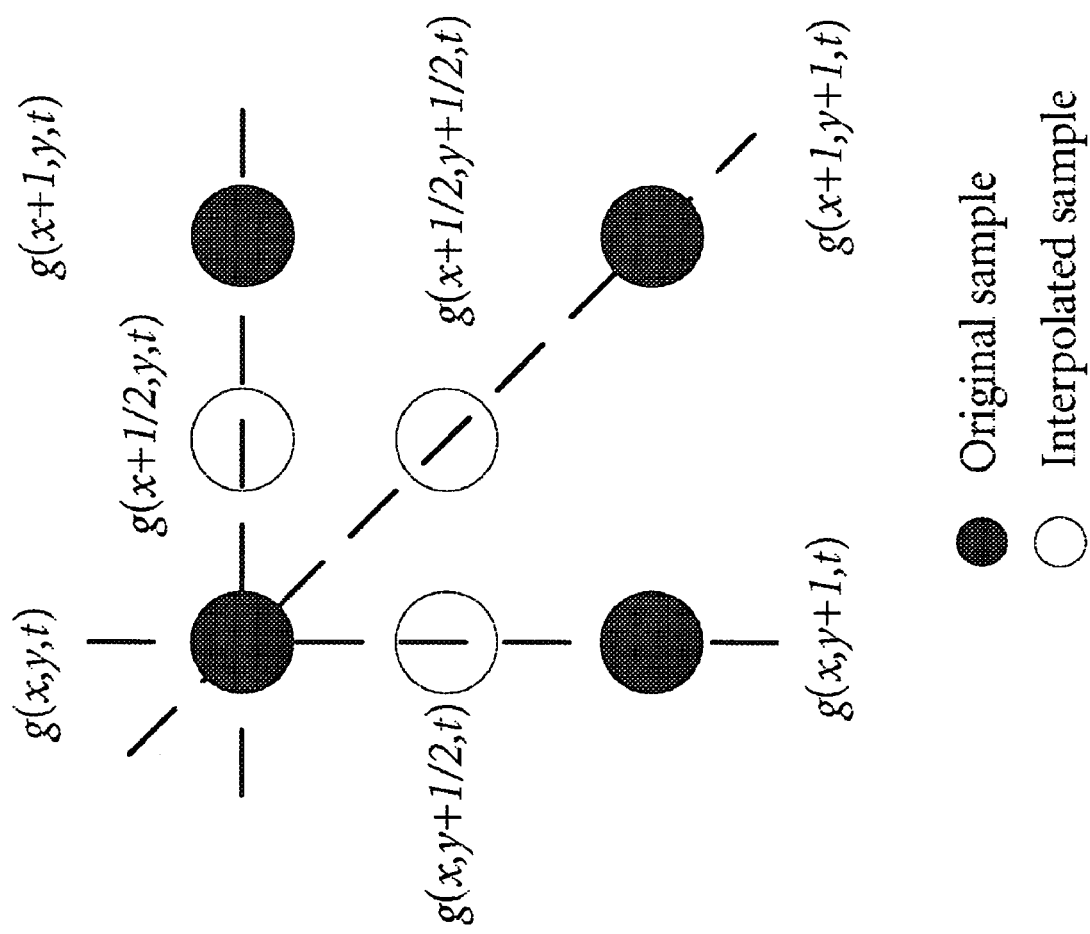
FIG. 3 shows a diagram of half-pel interpolation.

FIG. 3 shows an example of half-pel interpolation using a bilinear filter. The interpolated pixels at half-pel distance are found based on the following set of equations:

$$g\left(x+\frac{1}{2}, y, t-T\right) = [g(x, y, t-T) + g(x+1, y, t-T) + 1]/2;$$

$$g\left(x, y+\frac{1}{2}, t-T\right) = [g(x, y, t-T) + g(x, y+1, t-T) + 1]/2;$$

$$g\left(x+\frac{1}{2}, y+\frac{1}{2}, t-T\right) = \frac{\left[\begin{array}{c}g(x, y, t-T) + g(x+1, y, t-T) + \\ g(x, y+1, t-T) + g(x+1, y+1, t-T) + 2\end{array}\right]}{4}.$$

Broadcast video may be generated from video and film sources. In general, film is progressive and video is interlaced. It may be useful to define motion estimation and motion compensation in terms of this video characteristic. For example, a method according to an embodiment may be configured to use frame motion estimation for frames that are classified as progressive (i.e., the value of T is 1) and field motion estimation and compensation for frames that are classified as interlaced (the value of T is assumed to be 2).

In such a scheme, top_field current field motion vectors are predicted from one or more top_field reference fields, and bottom_field current field motion vectors are predicted from one or more bottom_field reference fields. This motion estimation decision may also be guided by a inverse telecine algorithm as discussed below. In one example, the block sizes used are $N_x=N_y=8$ pixels for progressive prediction and $N_x=8$, $N_y=16$ pixels for interlaced prediction (using frame coordinates). Typically a search window with size of $-8 \leq W_x \leq 7.5$ and $-8 \leq W_y \leq 7.5$ is enough to track desirable motion. Embodiments may be configured for application to any other values of $N_x$, $N_y$, $W_x$, and/or $W_y$.

An analytical model for measuring reduction of noise is also presented. Assuming uniform motion with perfect motion compensation, a filter according to expression (1) may be reduced to a one-dimensional temporal filter as illustrated in the manipulation below:

$$\hat{g}(x, y, t) = g(x - v_x, y - v_y, t - T)$$

$$g(x, y, t) = (1-\alpha)g(x - v_x, y - v_y, t - T) + \alpha f(x, y, t)$$

$$G(z_x, z_y, z_t) = (1-\alpha)G(z_x, z_y, z_t)z_x^{-v_x}z_y^{-v_y}z_t^{-T} + \alpha F(z_x, z_y, z_t)$$

$$H(z_x, z_y, z_t) = \frac{G(z_x, z_y, z_t)}{F(z_x, z_y, z_t)} = \frac{\alpha}{1 - (1-\alpha)z_x^{-v_x}z_y^{-v_y}z_t^{-T}}$$

In order to simplify the above model, let us assume that the video sequence is composed of still frames (i.e., $v_x = v_y = 0$). Since the resulting transfer function only depends on $z_t$, we can reduce the multidimensional transfer function to a one-dimensional transfer function as follows:

$$H(z) = \frac{G(z)}{F(z)} = \frac{\alpha}{1 - (1-\alpha)z^{-T}}. \quad (4)$$

In order to estimate the potential noise reduction gains, we assume that the signal input to the filter $f(x, y, t)$ is purely white noise and is denoted by $w(x, y, t)$ with power spectral density $S_w(\omega) = \sigma_w^2$ and $T=1$:

$$H(z) = \frac{\alpha}{1 - (1-\alpha)z^{-1}}, \text{ with } z = e^{j\omega},$$

$$|H(e^{j\omega})| = \frac{\alpha^2}{(1 - \beta e^{-j\omega})(1 - \beta e^{+j\omega})} = \frac{\alpha^2}{1 - 2\beta\cos\omega + \beta^2},$$

with $\beta$ defined as $(1-\alpha)$.

Using a familiar relationship of spectral estimation, we evaluate the power spectral density as $$S_\eta(e^{j\omega}) = |H(e^{j\omega})|^2 S_w(e^{j\omega}) = \frac{\alpha^2 \sigma_w^2}{1 - 2\beta\cos\omega + \beta^2}, \quad (5)$$

where the variance is given as $$\sigma_\eta^2 = \frac{1}{2\pi}\int_{-\pi}^{\pi} S_\eta(e^{j\omega})d\omega. \quad (6)$$

By applying the following solution for the integral of expression (6):

$$\int_0^\pi \frac{\cos nx}{1 + a^2 - 2a\cos x}dx = \frac{\pi a^n}{(1 - a^2)} \text{ with} \quad (7)$$
$$a^2 < 1 \text{ and } n \geq 0,$$

the estimated reduction of noise $\sigma_w^2$ is determined as $$\sigma_\eta^2 = \frac{1}{2\pi} \times 2 \times \frac{\pi a^2}{1 - \beta^2}\sigma_w^2 = \frac{\alpha}{2 - \alpha}\sigma_w^2 \quad (8)$$

For newly exposed parts of the video sequence (e.g., at a spatial border or a previously occluded object), the displacement field $(v_x, v_y)$ may not be defined. Also, the displacement estimate may not always be accurate, especially where expression (2) (ideal motion compensation) does not hold. As such regions typically have very high prediction error, the value of the weighting factor $\alpha$ may be made dependent on the prediction error $e(x, y, t)$. In one example, the value of $\alpha$ is determined according to the following expression:

$$\alpha(e) = \begin{cases} \alpha_b, & |e| \leq T_b \\ \frac{\alpha_e - \alpha_b}{T_e - T_b}(|e| - T_b) + \alpha_b, & T_b < |e| \leq T_e \\ \alpha_e, & |e| > T_e \end{cases} \quad (9)$$

Figure 4:
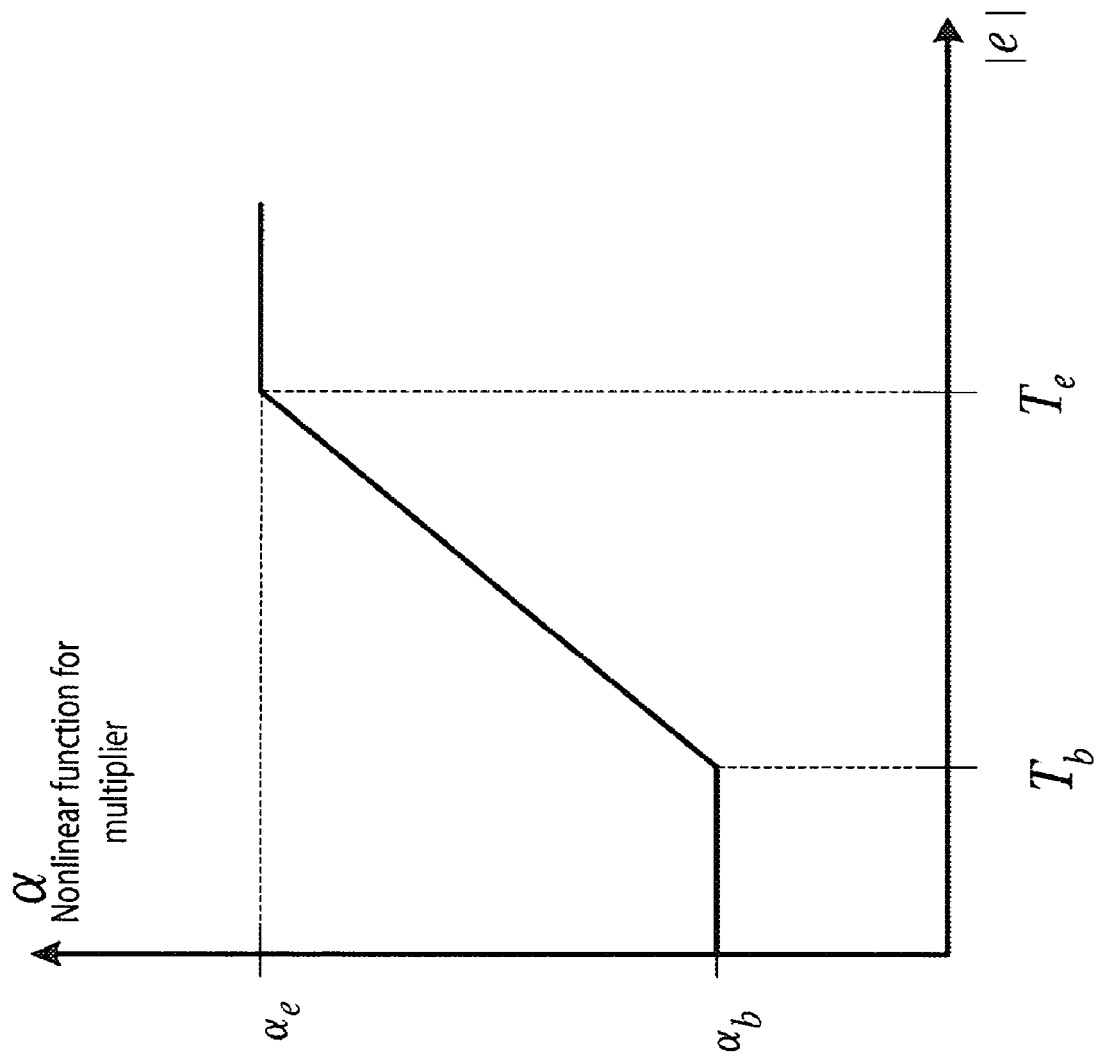
FIG. 4 shows a plot of a nonlinear function.

FIG. 4 illustrates a plot of the function $\alpha(e)$. It may be noted that when the prediction error signal $e(x, y, t)$ is small or on the order of the noise, linear temporal filtering is performed with parameter $\alpha = \alpha_b$, such that more smoothing is allowed, and that in regions where the prediction error signal $e(x, y, t)$ is large, linear temporal filtering is performed with parameter $\alpha = \alpha_e$, such that smoothing is reduced or disabled. In general, $\alpha_e$ is selected to be unity, but may have another value such as 0.9.

For intermediate values of the prediction error, $\alpha(e)$ may vary linearly between $\alpha_b$ and $\alpha_e$. In other embodiments, the value of $\alpha(e)$ may vary nonlinearly (e.g. as a sigmoid curve) between $\alpha_b$ and $\alpha_e$. Values for the parameter ab, the parameter $\alpha_e$, the prediction error thresholds $T_b$ and $T_e$, and/or the shape of the curve may be selected adaptively according to, for example, dynamics of the signal.

Features as described below may be applied to adapt the extent of filtering to such characteristics as the accuracy of motion estimation, local video characteristics, and/or global video characteristics. Potential advantages of such methods include enabling better quality output video by reducing smearing artifacts.

A scene change may cause a decrease in the visual quality of the first noise-reduced frame of a new scene, since the prediction error is likely to be high. Also, due to the nature of the recursive filtering, artifacts may be propagated into successive frames. Although an adaptive value of $\alpha(e)$ may limit this effect in areas with a high prediction error, some areas of the frame may, at random, have a low prediction error. Thus it may be desirable to disable noise reduction for the first frame of a new scene instead of limiting it on a local (e.g., pixel-by-pixel) basis.

Figure 5:
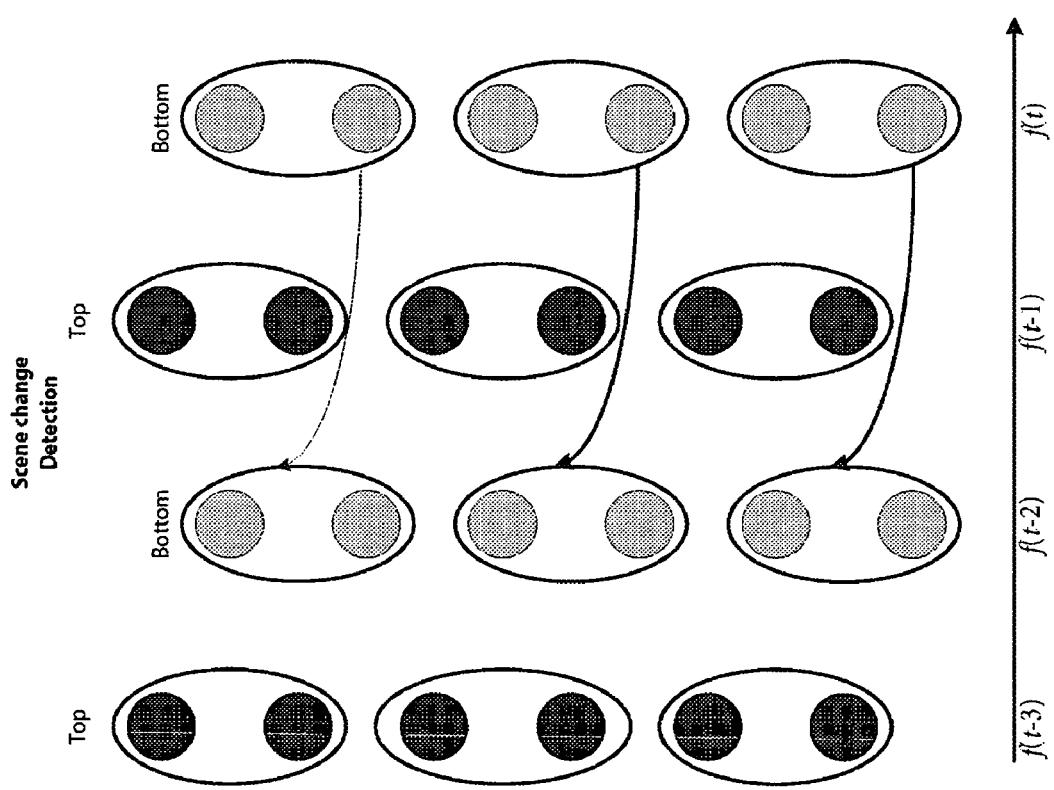
FIG. 5 shows a diagram of spatio-temporal support for a scene change detection.

A scene change detection mechanism may be based on a field difference measure calculation such as the following:

$$M(k) = \left|\left(\sum_{y=16k}^{15+16k}\sum_{x=0}^{w}f(x, y, t)\right) - \left(\sum_{y=16k}^{15+16k}\sum_{x=0}^{w}f(x, y, t-2)\right)\right| \text{ for } k = 0, \quad (10)$$

$$\ldots, \frac{h}{16},$$

where $f(x, y, t)$ denotes pixel intensity with the triplet $(x, y, t)$ denoting spatial-temporal coordinates. In expression (10), $w$ denotes picture width and $h$ picture height. In this example, the calculation is done by measuring differences between field segments that have the same video parity (i.e., top and bottom field slice differences are evaluated). Such an operation is illustrated in FIG. 5. For example, a typical standard-definition picture with 720×480 pixels may be processed as thirty slices, each having a height of sixteen pixels.

After calculation of M(k), a comparison with a threshold may be performed, with the number of slices having differences greater than (alternatively, not less than) the threshold being counted. In one example, if the number of slices which exceed the threshold corresponds to a picture area that covers more than some portion (e.g. 50%) of the picture, a scene change flag S is set:

$$S = \begin{cases} 1, & \text{if number of } M(k) \geq T_M \text{ exceeds 50\% of the picture} \\ 0, & \text{otherwise} \end{cases} \quad (11)$$

where $T_M$ denotes a threshold. In one example, $T_M$ has a value of 32 times the number of pixels in a strip (e.g., 368,640 for a strip that is 720 pixels wide and 16 pixels high). Such a result may be used to qualify or otherwise modify the value of $\alpha(e)$, as in the following example:

$$\alpha(e,S) = (1-S)\alpha(e) + 1. \quad (12)$$

A potential advantage of an implementation including scene change detection is a reduction in wasted processing cycles for frames in which a scene change is detected.

A video frame may consist of two fields. In general, film is generated at 24 frames per second. Film is typically converted to video (e.g., to 480i/29.97 Hz format) using a technique called 2-3 pulldown (or telecine), in which certain fields are repeated in a sequence of four film frames to produce five video frames. The inverse process is called 3-2 pulldown or inverse telecine. It may be desirable for a noise reducer to identify this temporal redundancy in order to discriminate between frames from an interlaced source, such as video, and frames from a progressive source, such as film. If the source is interlaced (e.g., each field in a frame corresponds to a different time interval), it may be desirable to use field motion estimation and compensation. If the source is progressive (e.g., each field in a frame corresponds to the same time interval), it may be desirable to use frame motion estimation and compensation.

In a method that includes inverse telecine processing, if the current frame is determined to be from a film source, it is identified as a progressive frame, and a frame motion procedure is performed. Otherwise, field motion is performed. The field repetition discrimination operation may be complex, since it can be very difficult to distinguish true repeat fields due to noise.

Figure 6:
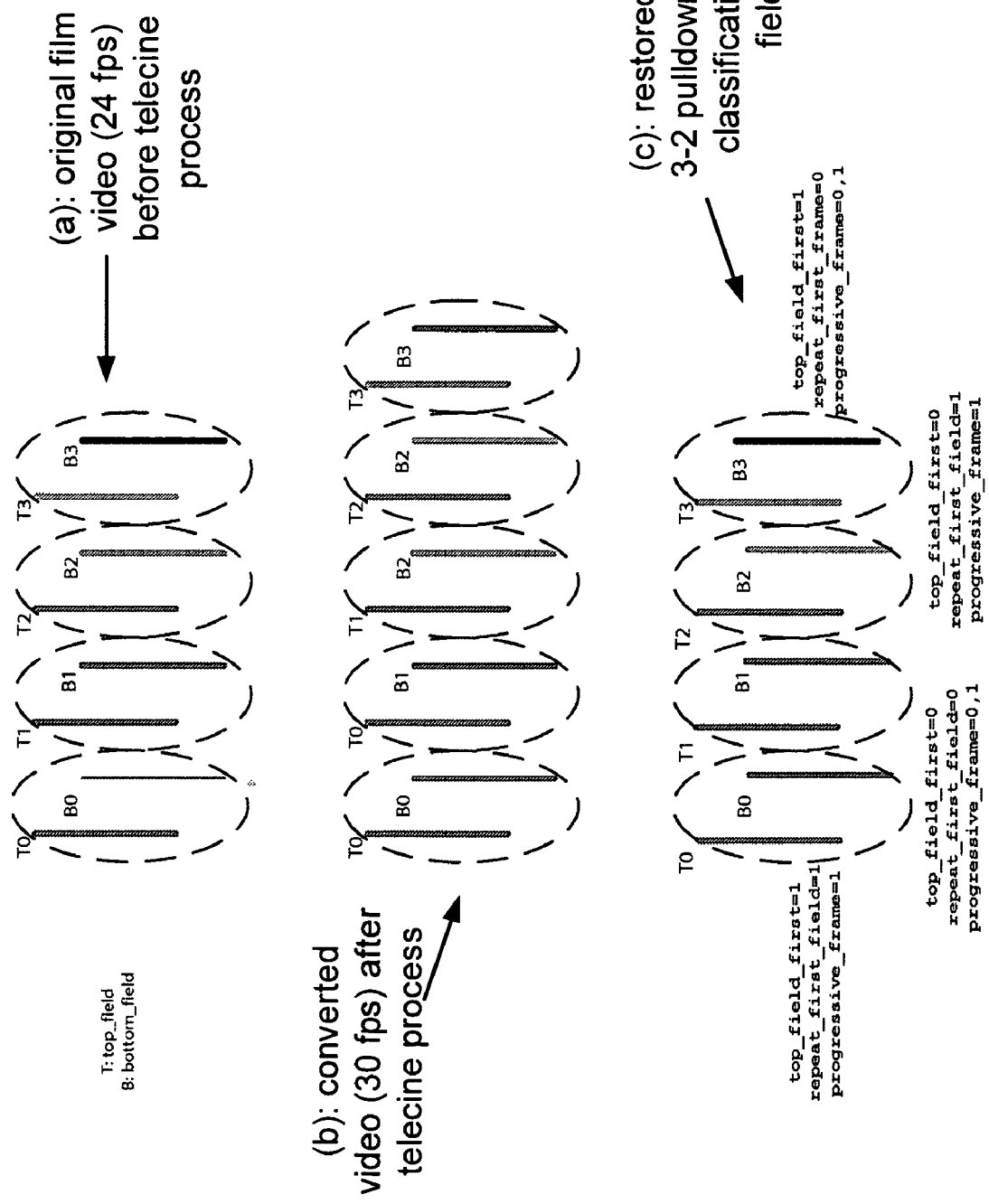
FIG. 6 shows an inverse telecine process.

FIG. 6 shows an example of a 3-2 pulldown process. The repeat_first_field flag indicates field repetition, progressive_frame indicates a non-interlaced frame and top_field_first indicates field dominance. In one implementation of a noise reducer, these flags are syntactical elements.

A 3-2 pulldown process may be applied to noise-reduce a five-frame sequence without having to process the repeated fields. FIG. 6(a) shows the original film video (24 frames per second) before the telecine process. FIG. 6(b) shows the five frames of the corresponding converted video (30 fps) after the telecine process. FIG. 6(c) illustrates the four frames that result from applying a 3-2 pulldown process to the five frames of FIG. 6(b). FIG. 6(c) also describes field classification according to the syntactical flags.

In order to detect a true 3-2 pulldown cadence with reliability, it is may be desirable to first collect field differences as in a scene change detector, but with the difference that in this case we are looking for field equalities. In one example, a slice is considered a match if the difference is less than (alternatively, not greater than) a threshold value which is used to allow for noise. A field may then be considered a match if some proportion (e.g. more than 80%) of its slices match:

$$\text{repeat\_first\_field} = \begin{cases} 1, & \text{if number of } M(k) \leq T_P \text{ exceeds 80\% of the picture filed} \\ 0, & \text{otherwise} \end{cases}$$

where repeat_first_field is a flag that denotes field equalities and $T_P$ is a threshold to allow for noise. In one example, $T_P$ has a value that is ¾ times the number of pixels in a strip (e.g., 4320 for a strip that is 720 pixels wide and 8 pixels high).

These field equalities may be recorded in a set R. In one example, this set can hold the field equality flags for 5 frames. As a new frame is processed, two new binary values are added to the set, one for the top field and one for the bottom field. A binary value of '1' indicates equality of fields and a binary value of '0' indicates inequality.

If the set R is full, it is shifted to remove the oldest entries to make room for the new data. When the set contains data for 5 frames, the cadence detection can proceed. In one example, set R is compared with a list of valid patterns as shown below:
$S^T(0) = (0,0,0,0,1,0,0,0,0,1)$;
$S^T(1) = (0,0,1,0,0,0,0,1,0,0)$;
$S^T(2) = (1,0,0,0,0,1,0,0,0,0)$;
$S^T(3) = (0,0,0,1,0,0,0,0,1,0)$;
$S^T(4) = (0,1,0,0,0,0,1,0,0,0)$;
$S^B(0) = (0,0,0,0,1,0,0,1,0,0)$;
$S^B(1) = (0,0,0,1,0,0,1,0,0,0)$;
$S^B(2) = (0,1,0,0,1,0,0,0,0,0)$;
$S^B(3) = (0,0,1,0,0,0,0,0,0,1)$;
$S^B(4) = (1,0,0,0,0,0,0,1,0,0)$.

If the set R(t) is equivalent to any one of the sets $S_{0,\ldots,4}^{T,B}$, then the related frames are identified as film and flagged as progressive. In the example above, the sets $S^T$ represent sequences in which the top field is received first, the sets $S^B$ represent sequences in which the bottom field is received first, and each new pair of flags is right-shifted into R according to the order in which the corresponding fields are received.

If R(t) is equivalent to set $S^T(1)$, then for the new frame captured at the instant t+1, it should hold $R(t+1) \equiv S^T(2)$, $R(t+2) \equiv S^T(3), \ldots, R(t+4) \equiv S^T(0)$. Likewise, if R(t) is equivalent to set $S^B(1)$, then for the new frame captured at the instant t+1, it should hold $R(t+1) \equiv S^B(2)$, $R(t+2) \equiv S^B(3), \ldots, R(t+4) \equiv S^B(0)$.

When the cadence is broken at t' (which may occur due to scene changes, insertion of commercials, or video editing, for example), the set R is set to:

$$R(t') \leftarrow (0,0,x,x,x,x,x,x,x,x)$$

where x denotes a binary value that it is not available.

In analog video, there are two types of blanking intervals. The horizontal blanking interval occurs between scan lines, and the vertical blanking interval (VBI) occurs between frames (or fields). The horizontal blanking interval is present in every video line in general and carries horizontal synchronization information. The vertical blanking interval carries vertical synchronization and other types of information, such as a closed captioning (CC) signal. A VBI line of an analog video signal carries deterministic signals that can be used for noise estimation process.

Figure 7:
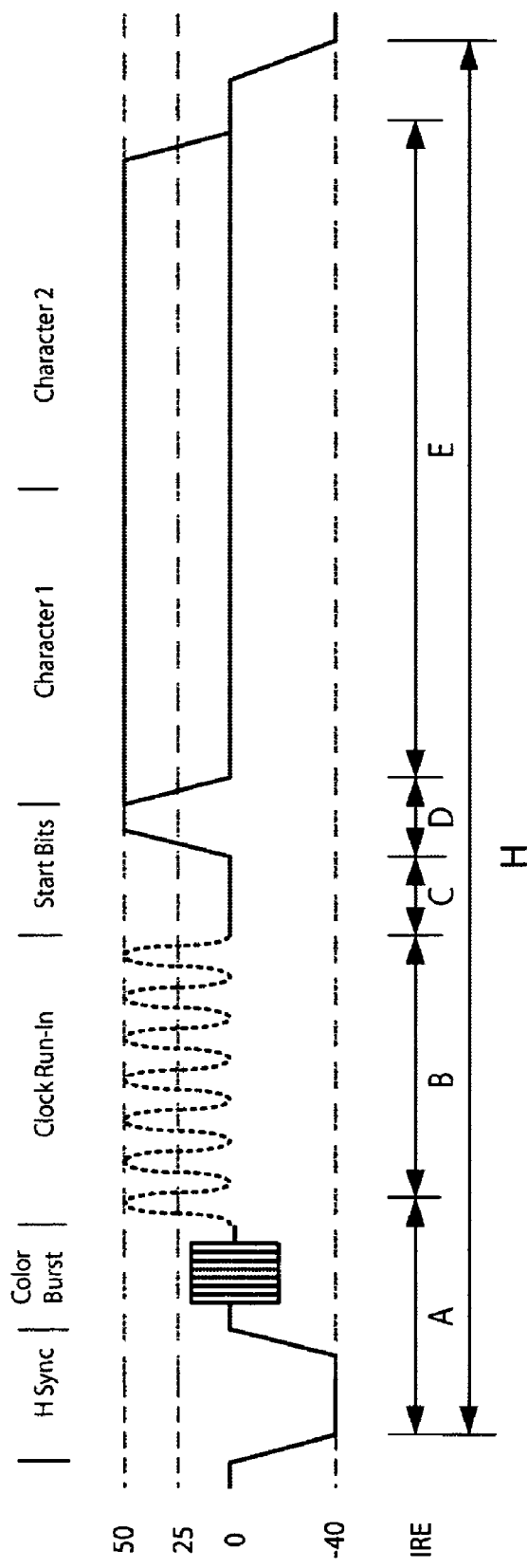
FIG. 7 shows a diagram of closed captioning timing on lines 21 and 284 of an NTSC (National Television System Committee) video signal.

FIG. 7 shows a diagram of the CC timing waveform in an NTSC signal. This waveform appears on lines 21 and 284 for NTSC and on lines 21 and 334 for PAL (Phase Alternating Line). This waveform can be sliced in several segments corresponding to:
A: Color carrier burst;
B: a seven-cycle sinusoidal burst that is frequency-locked and phase-locked to the caption data and is used to provide synchronization for the CC decoder;
C: Blanking level;
D: Start bit; and
E: ASCII characters (caption data).

It may be desired in this waveform to estimate noise variance at segment D in FIG. 7, since this portion is transmitted as a flat pulse and may be expected to have enough dynamic range for noise observation. The number of samples in this pulse depends on the sampling frequency used to sample it (e.g., four, eight, or sixteen times the subcarrier frequency).

If we denote by $N_s$ the number of samples available in segment D, then a sampled average may be defined as:

$$m_s = \frac{1}{N_s} \sum_{n=1}^{N_s} f^{T,B}(n, y, t), \qquad (13)$$

with variance defined as $$\sigma_s^2 = \frac{1}{N_s} \sum_{n=1}^{N_s} (f^{T,B}(n, y, t) - m_s)^2. \qquad (14)$$

This calculation may be performed for top ($f^T$) and bottom ($f^B$) fields.

Figure 8:
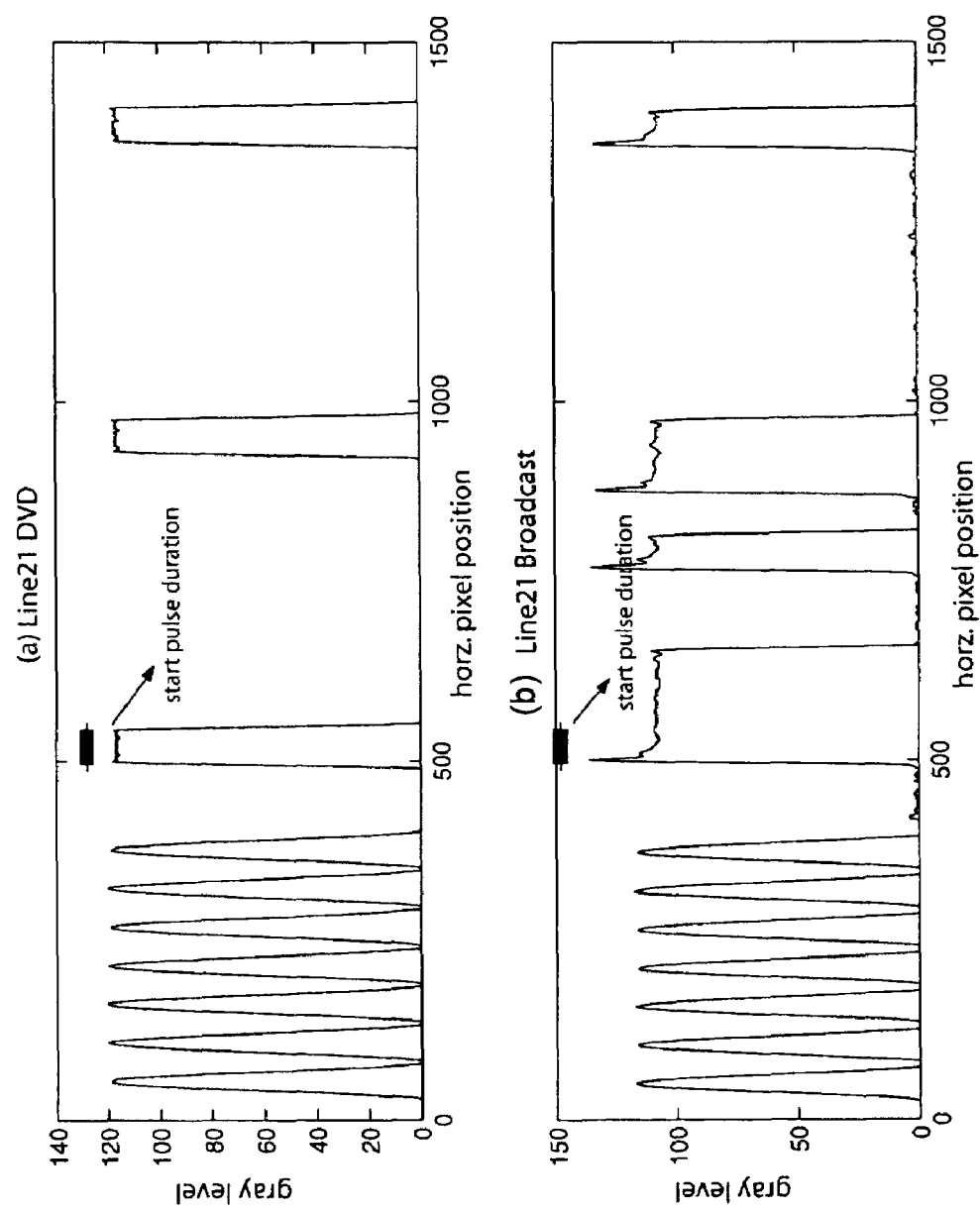
FIG. 8 shows a diagram of NTSC line 21 as acquired from a clean video source (top) and from a noisy video source (bottom).

FIG. 8 shows examples of waveforms of line 21 from a clean source (a DVD disk) and from an off-air broadcast. A variance calculation based on this figure shows that broadcast signals may have a noise variance that is an order of magnitude higher than the noise variance of a signal originating from a clean source such as a DVD disk.

A method of noise reduction may be implemented such that the initial value of $\alpha_b$ from expression (9) is dependent on information obtained during the VBI. In one example, the noise variance $\sigma_f^2$ is defined as $$\sigma_f^2 = \max(\sigma_s^{2,T}, \sigma_s^{2,B}),$$

and the value of $\alpha_b$ is set as follows:

$$\alpha_b(\sigma_f^2) = \begin{cases} 1.0, & \sigma_f^2 < 8.0 \\ 0.75, & 8.0 \leq \sigma_f^2 < 16.0 \\ 0.5, & 16.0 \leq \sigma_f^2 < 64.0 \\ 0.33, & \sigma_f^2 \geq 64.0 \end{cases},$$

with $\alpha_e$ equal to unity.

A method for locating segment D is described. Such a method may include slicing the VBI line to identify locations of the cycles of the sine wave in segment B, the heights of their peaks and troughs, and their period. A section of samples is examined that can be expected to fall within the 7 cycles of the sine wave, based on the number of samples in the entire line. It may be desirable to examine enough samples to include more than one (e.g. about two) complete cycles of the sine wave.

The entire array of samples from a VBI line may be divided into 26 sections of equal width. In order, they are: 7 sine wave cycles, 3 start bits (two blanking level bits and one high bit), 7 data bits, 1 parity bit, 7 data bits, and 1 parity bit (assuming that the color burst and earlier portions of the line are not included in the array of samples). Since the sine wave is the first of these sections in the array of samples, it occupies roughly the first 27% of the samples.

One method of slicing (or parsing) the VBI line includes selecting peak and trough values of the sine wave. The following pseudo-code shows one example of calculations based on two indices located roughly in the center of the sine wave and separated by approximately two cycles of the sine wave. In this method, the minimum and maximum sample values between those two indices are stored as indicators of the peak and trough values of the sine wave:

```
begin = 107 * num_samples / 1024;
end = 186 * num_samples / 1024;
s_min = min(sample[begin] .. sample[end]);
s_max = max(sample[begin] .. sample[end]);
```

Although there may be a small number of samples prior to the start of the first cycle of the sine wave and a small number of samples after the final parity bit, these calculations are typically conservative enough to insure that all the samples from beginning to end are within the sine wave.

Based on the range of values observed in this subset of the sine wave, threshold values may be calculated for determining when the wave is transitioning from one part of its cycle to another. Such threshold values are used during an iteration through the sample array from the beginning, locating each cycle of the sine wave. This iteration may include cycling sequentially through four states: ENTERING_PEAK, IN_PEAK, ENTERING_TROUGH, and IN_TROUGH.

FIG. 10 shows an example of a pseudo-code sequence describing such an iteration. In this example, the period of the sine wave (and thus the width of the start, data and parity bits) is determined by subtracting the sample index where the first sine wave cycle crosses its midpoint with positive slope from the sample index where the seventh cycle crosses its midpoint with positive slope, and dividing the resulting sample count by 6. To maintain accuracy in locating all the bits, it may be desirable to perform this fixed point calculation with fractional precision, such as in the following example:

```
period=((wave[6]−wave[0])<<INDEX_FRAC_BITS)/
    6;
``` where typical values for INDEX_FRAC_BITS include 8, 10, and 12.

The index of the sample at the center of any start, data, or parity bit may be calculated by multiplying the sine-wave period by the appropriate amount and adding the result to the index that indicates the location of the seventh sine-wave cycle. FIG. 11 shows an example of a pseudo-code sequence that calculates the average and variance of samples composing the third (high) start bit, using a number of samples equal to three-fourths of the width of one bit. Using only three-fourths of the samples is one way to insure that if there is a rising or falling edge adjacent to the samples that define the bit, we do not include any edge samples in our calculation. Other intervals or schemes for excluding or removing edge samples may be used as well.

Although it is not necessary to use all the start, data and parity bits in such a noise measurement, methods may include verifying that all the start bits have the expected values and/or that the parity bits correspond correctly to the data bits. If there are any errors in the start bits or parity bits, the very presence of these errors can be used as indicators of a high noise level. Similarly, if an error occurs in the code that attempts to locate the cycles of the sine wave, the occurrence of such error may be used to indicate a high noise level.

It is noted that the principles described above may also be applied to obtain one or more noise statistics (e.g., variance) from other deterministic regions of a video signal. For example, such principles may be applied to determine noise statistics from portions of a vertical blanking interval (also called "field blanking interval") of an NTSC, PAL, or SECAM (Séquentiel couleur avec memoire) video signal that is configured according to a format such as teletext (e.g., as described in reference specification ETS 300 706), VPS signaling, or Wide Screen Signaling (e.g., as described in specification ETSI 300 294 and/or SMPTE RP 186).

It may be desirable for a noise reducer to take into account variations in the local DC (direct current) level. For example, it may be desirable to minimize local DC changes introduced by the noise reducer, as such changes may be noticeable in the resulting image, especially on large screens and especially in regions of flat color. The error between the current sample to be filtered $f(x, y, t)$ and motion compensated sample $g(x-v_x, y-v_y, t-T)$ as set forth in expression (9) may not be enough to guarantee local DC preservation. Further embodiments include methods, systems, and apparatus in which the thresholds $T_b$ and $T_e$ are functions of the local DC level.

In one example, the local DC level is quantified as follows:

$$DC(x,y,t)=[f(x-1,y,t)+f(x,y,t)+f(x+1,y,t)]/3.$$

Different fixed and/or adaptive neighborhoods may also be used. For example, a one-dimensional neighborhood of five pixels (e.g. centered at the current pixel) may be used, although it has been observed that the comparative advantage may decrease for neighborhoods larger than five pixels. The deviation between the DC and the current noisy sample is then set forth as $$AC(x,y,t)=|f(x,y,t)-DC(x,y,t)|.$$

Figure 12:
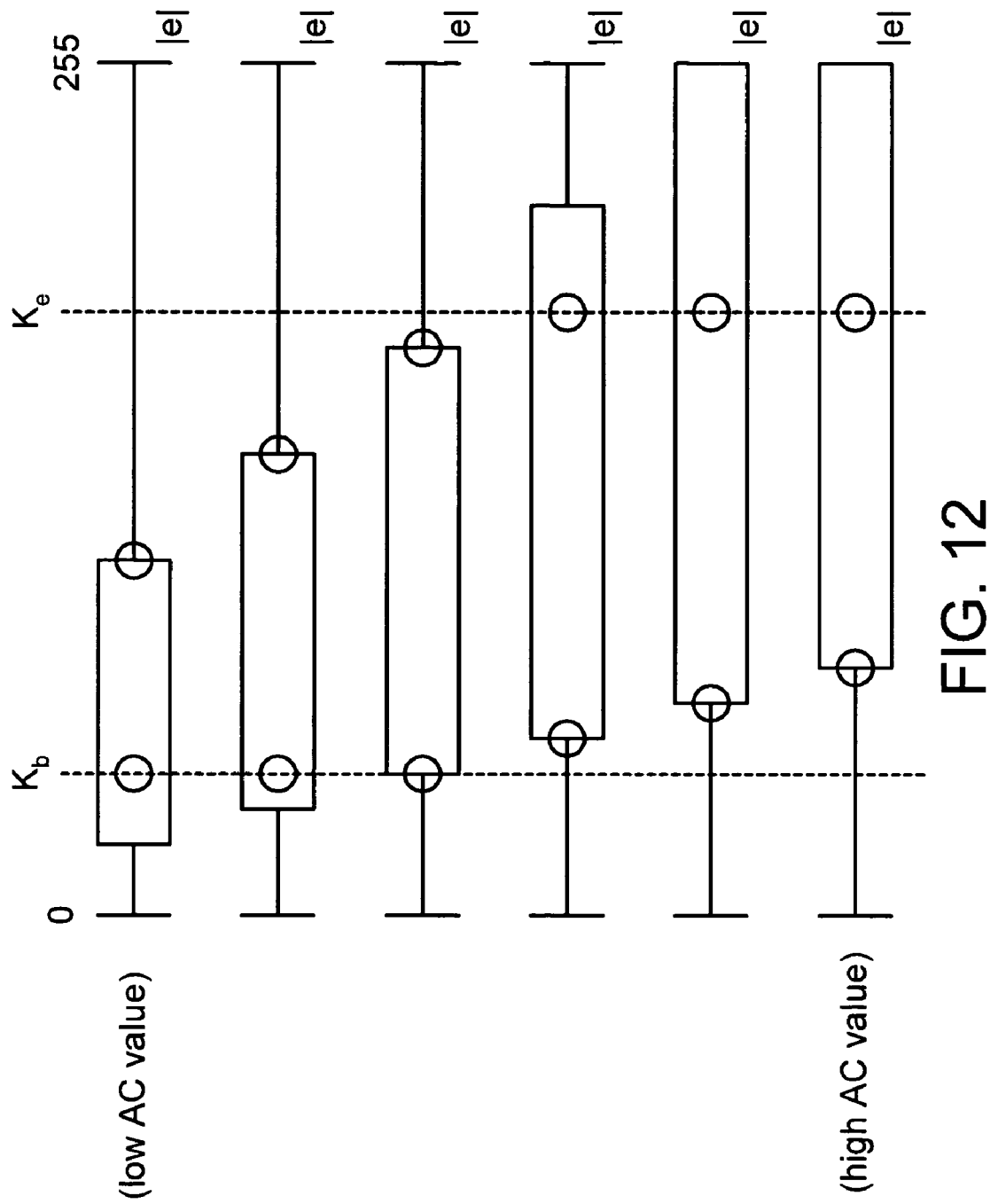
FIG. 12 illustrates a behavior of values of $T_b$ and $T_e$ as a value of AC changes.

The AC value may be used to control the values of $T_b$ and $T_e$. In one example, values for $T_b$ and $T_e$ are determined as follows:

$$T_b(AC)=\max(AC,K_b) \text{ and } T_e(AC,T_b)=\min(\delta \times AC+T_b(AC),K_e);$$

where $K_e > K_b$ are positive constants used to bound $T_b$ and $T_e$, and $\delta$ is a constant that controls the error swing of $e=|f(x,y,t)-g(x-v_x,y-v_y,t)|$. According to this example (and setting $\alpha_e$ equal to 1.0), expression (9) may be rewritten as FIG. 12 applies the description above to illustrate how the values of $T_b$ and $T_e$ may change as the value of AC increases, for an example in which $|e|$ has the range 0 to 255. In this figure, the boxes represent the ranges from AC to $\delta \times AC+T_b(AC)$ (e.g., up to 255), and the circles represent corresponding values of $T_b$ and $T_e$. At the top of the figure, the value of AC is low, such that the value of $T_b$ is determined by $K_b$ and the value of $T_e$ is determined by AC. At the bottom of the figure, the value of AC is high, such that the value of $T_b$ is determined by AC and the value of $T_e$ is determined by $K_e$. In one example, the value of $\delta$ is 3, the value of $K_b$ is 32, and the value of $K_e$ is 96.

Such an expression may be further modified (e.g., according to expression (12) above) to take scene changes into account:

$$a(e,S,\sigma_f^2)=(1-S)\alpha(e,\sigma_f^2)+1.$$

A system including these features may thus be modeled as $$g(x,y,t)=(1-\alpha(e,S,\sigma_f^2))\tilde{g}(x,y,t)+\alpha(e,S,\sigma_f^2)f(x,y,t).$$

As disclosed herein, additional information may be obtained from a video signal and used to guide a motion-adaptive or motion-compensated temporal filtering process. For example, one or more detection mechanisms as described herein (e.g. scene change detection, inverse telecine) may be included and may make such noise reduction more robust. Alternatively or additionally, local DC levels and/or information obtained during other portions of the signal (e.g. one or more horizontal and/or vertical blanking intervals) may be used in a noise reduction operation.

Figure 9:
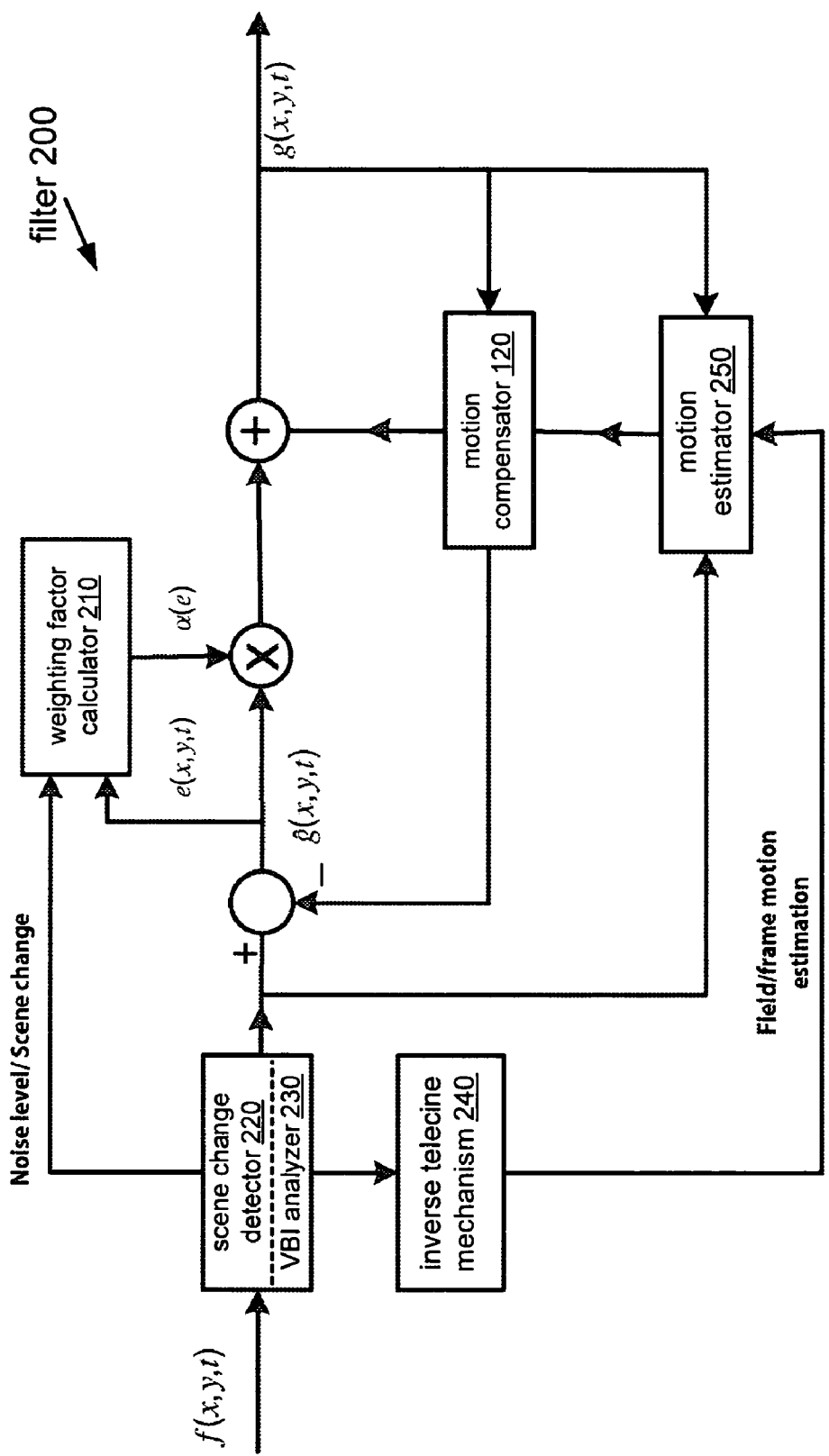
FIG. 9 shows a diagram of a motion-compensated temporal filter 200 according to an embodiment.

A noise reducer system or apparatus may be implemented to include features as described herein. For example, such a system or apparatus may include mechanisms for scene detection, inverse telecine, and VBI noise level estimation. FIG. 9 shows a block diagram of an example of such an apparatus: a motion-compensated temporal filter 200 that includes a weighting factor calculator 210, motion compensator 120, a scene change detector 220, a VBI analyzer 230, an inverse telecine mechanism 240, and a motion estimator 250 configured to perform block motion estimation.

Figures 13A, 13B:
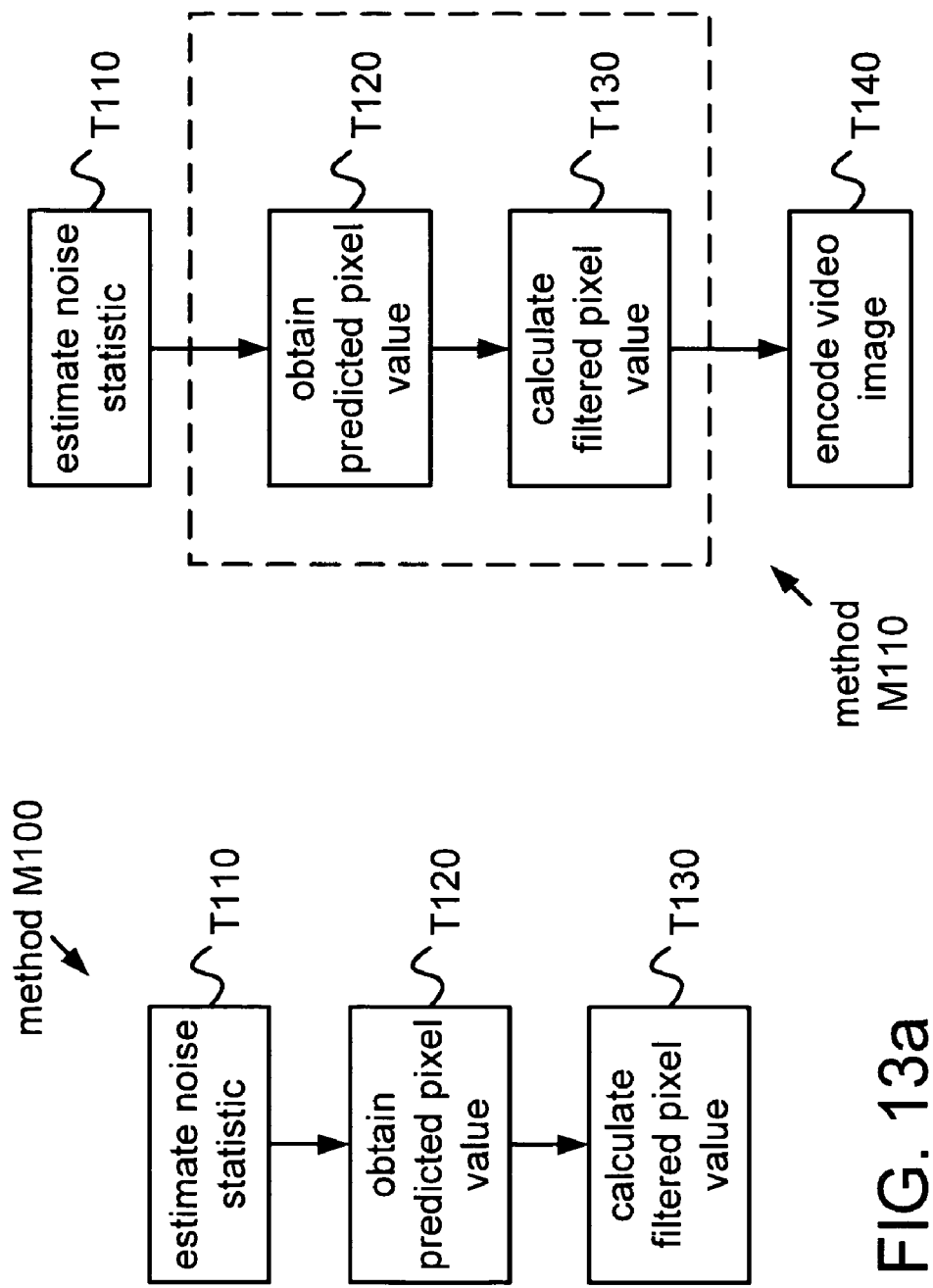
FIG. 13a shows a flowchart of a method M100 according to an embodiment.
FIG. 13b shows a flowchart of an implementation M110 of method

FIG. 13a shows a flowchart of a method M100 according to an embodiment. Task T110 estimates a noise statistic of a video signal that includes a pixel value to be processed. For example, task T110 may be configured to calculate the noise statistic according to a deterministic portion of the video signal, such as a portion that occurs during the vertical blanking interval. Task T120 obtains a predicted pixel value according to a motion vector and a location of the pixel value to be processed. In some cases, task T120 may be configured to obtain the predicted pixel value according to other information as well, such as one or more additional motion vectors. Task T130 calculates a filtered pixel value based on the pixel value, the predicted pixel value, and a weighting factor based on the estimated noise statistic. The weighting factor may also depend on the distance between the pixel value and the predicted pixel value.

$$\alpha(e,\sigma_f^2) = \begin{cases} \alpha_b(\sigma_f^2), & |e| \leq T_b(AC) \\ \dfrac{1-\alpha_b(\sigma_f^2)}{T_e(AC,T_b)-T_b(AC)}(|e|-T_b(AC))+\alpha_b(\sigma_f^2), & T_b(AC) < |e| \leq T_e(AC,T_b) \\ 1, & |e| > T_e(AC,T_b) \end{cases}$$

FIG. 13b shows a flowchart of an implementation M110 of method M100. In this example, tasks T120 and T130 are repeated for some or all of the pixels in a video image. Task T140 encodes the resulting filtered image according to, for example, a DCT-based scheme such as MPEG-1 or MPEG-2.

Figure 14:
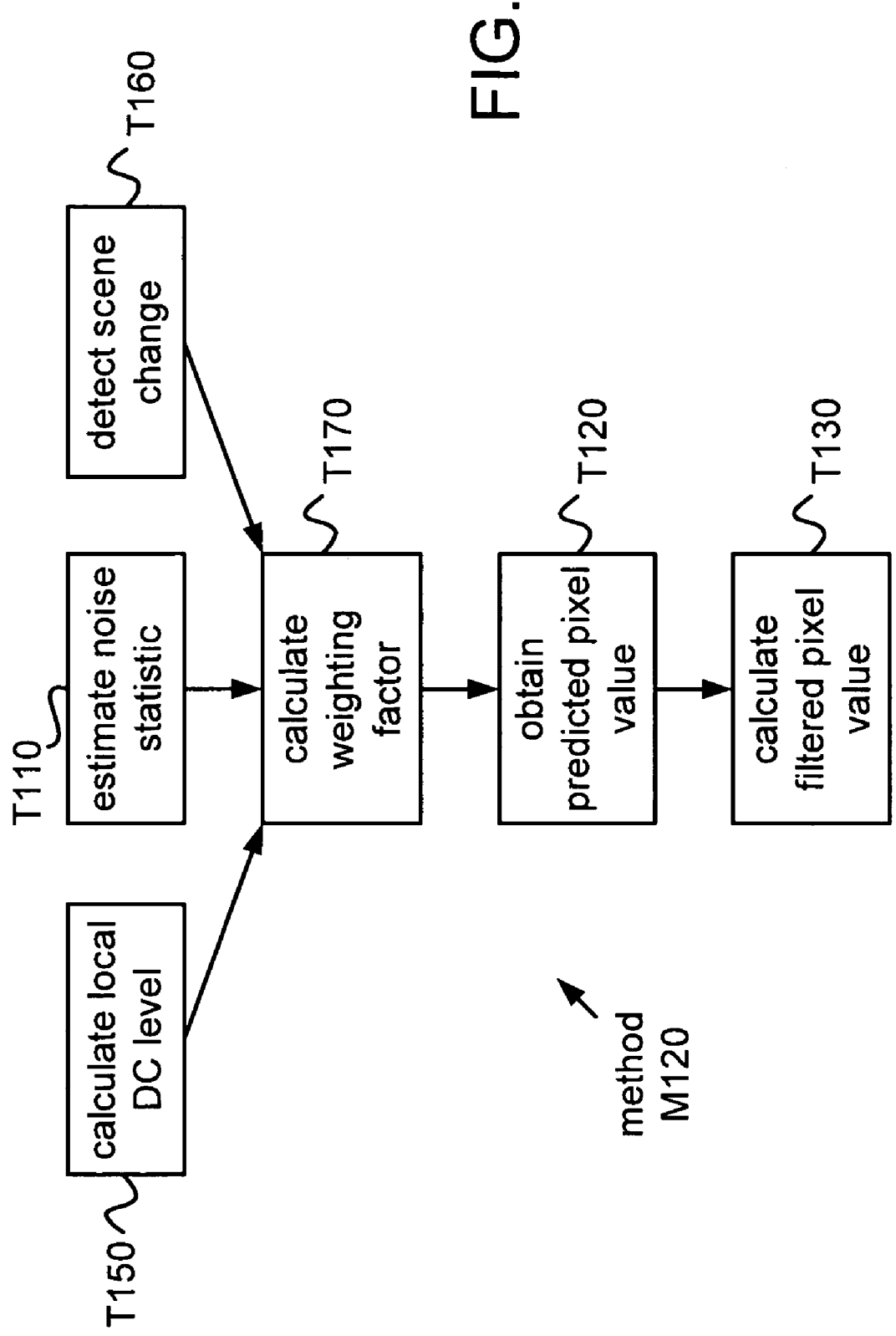
FIG. 14 shows a flowchart of an implementation M120 of method M100.

FIG. 14 shows a flowchart of an implementation M120 of method M100. Task T150 calculates a local DC level of the pixel value. For example, task T150 may be configured to calculate the local DC level as an average of pixel values in a neighborhood of the pixel value. Task T160 detects whether a scene change has occurred in the video signal. Task T170 calculates the weighting factor based on the calculated local DC level and on the scene change detection.

Figure 15:
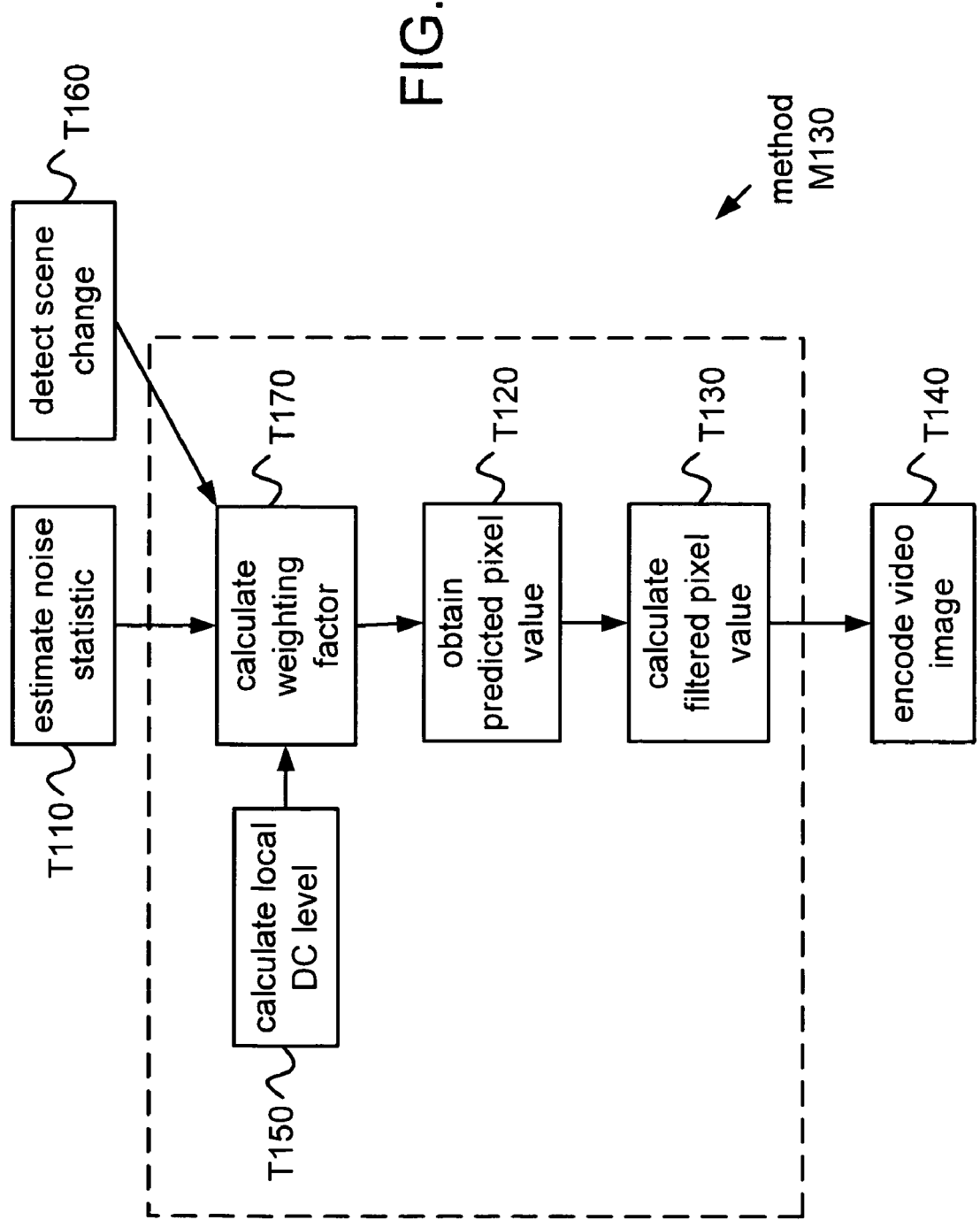
FIG. 15 shows a flowchart of an implementation M130 of method M120.

FIG. 15 shows a flowchart of an implementation M130 of method M120. In this example, tasks T150, T170, T120, and T130 are repeated for some or all of the pixels in a video image. Task T140 encodes the resulting filtered image according to, for example, a DCT-based scheme such as MPEG-1 or MPEG-2.

In one example, processing of a video signal includes the following operations:

1) the digital video signal is buffered for four frames with the respective VBI information;

2) noise estimation is performed for each of these frames, and an individual $\alpha_b$ is calculated for each frame;

3) scene change detection is performed once per frame, with detected scene changes disabling noise reduction;

4) inverse telecine is also performed once per frame, enabling a field or frame decision for motion estimation;

5) motion estimation and compensation is performed;

6) motion compensated temporal filtering is then performed, with appropriate $T_b$ and $T_e$ evaluated at pixel level; and 7) the filtered frame is then stored in the frame buffer to be used as the reference in the next iteration.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

One possible effect of a noise reduction as described herein is to provide a signal that may be encoded at a low bit rate and/or high compression ratio, while reducing noise artifacts and/or preserving high-frequency picture information (e.g. edges) in the signal.

A video signal processed by a method, system, or apparatus for noise reduction as disclosed herein may be provided as input to a video encoder. Examples of an encoding scheme as may be applied by such an encoder, which may be a constant bit rate (CBR) or variable bit rate (VBR) scheme, include DCT-based schemes such as MPEG-1 or MPEG-2. It may be desired to support real-time encoding. In some implementations, a noise reducer according to an embodiment resides on the same chip, or in the same chipset, as such an encoder. FIG. 16a shows a block diagram of an integrated circuit device 400 including an implementation of filter 200 and an encoder 300. Applications of such devices include media-enabled personal computers; "time-shifting" entertainment devices such as personal video recorders and set-top boxes; and video cameras recording onto tape, optical disk, or semiconductor (e.g. flash or ferroelectric) memory. FIG. 16b shows a block diagram of a video recorder 500 that includes integrated circuit device 400 and a recording medium 350.

What is claimed is:

1. A method of processing a video signal, said method comprising:

according to a motion vector and a location of a first pixel value of the video signal, obtaining a predicted pixel value;

according to a known signal content of the video signal, estimating a noise statistic of the video signal; and based on the first pixel value, the predicted pixel value, and a weighting factor, calculating a second pixel value, wherein the weighting factor is based on the estimated noise statistic, and wherein the known signal content includes at least one deterministic portion of the video signal.

2. The method according to claim 1, wherein said estimating a noise statistic includes estimating a noise variance.

3. The method according to claim 1, wherein the at least one deterministic portion includes a portion of the video signal that occurs during a vertical blanking interval.

4. The method according to claim 3, wherein the portion of the video signal that occurs during a vertical blanking interval includes a portion of the video signal that occurs during a closed captioning signal.

5. The method according to claim 1, wherein the first pixel value occurs within a first frame of the video signal, and wherein the predicted pixel value is based on at least one pixel value that occurs within a second frame of the video signal that is prior to the first frame.

6. The method according to claim 5, said method comprising:

determining whether one among a plurality of sequences of field equalities is present within the video signal, and selecting the second frame according to a result of said determining.

7. The method according to claim 1, wherein said obtaining a predicted pixel value includes interpolating the predicted pixel value based on a plurality of pixel values that each occur within a frame of the video signal that is prior to the first frame.

8. The method according to claim 1, wherein the weighting factor is based on a distance between the first pixel value and the predicted pixel value.

9. The method according to claim 1, said method comprising, for each of a plurality of pixel values of the first frame:

according to a corresponding motion vector and a location of the pixel value, obtaining a corresponding predicted pixel value; and based on the pixel value, the corresponding predicted pixel value, and the weighting factor, calculating a corresponding filtered pixel value.

10. The method according to claim 9, said method comprising encoding an image that includes the second pixel value and the plurality of filtered pixel values.

11. The method according to claim 10, said encoding comprising encoding the image according to a discrete-cosine-transform-based encoding scheme.

12. A data storage medium having machine-executable instructions describing the method according to claim 1.

13. The method according to claim 1, wherein the weighting factor is based on an average value of a region of the video signal that includes the first pixel value.

14. A method of processing a video signal, said method comprising:
according to a motion vector and a location of a first pixel value of the video signal, obtaining a predicted pixel value;
detecting a scene change within the video signal; and
based on the first pixel value, the predicted pixel value, and a weighting factor, calculating a second pixel value,
wherein the weighting factor is based on a result of said detecting a scene change.

15. The method according to claim 14, wherein said method comprises estimating a noise statistic of the video signal according to a known signal content of the video signal, and
wherein the weighting factor is based on the estimated noise statistic, and
wherein the known signal content includes at least one deterministic portion of the video signal.

16. The method according to claim 15, wherein the at least one deterministic portion includes a portion of the video signal that occurs during a vertical blanking interval.

17. An apparatus comprising:
a motion compensator configured to produce a predicted pixel value according to a motion vector and a location of a first pixel value of a video signal;
a noise estimator configured to estimate a noise statistic of the video signal according to a known signal content of the video signal;
a weighting factor calculator configured to calculate a weighting factor based on the estimated noise statistic; and
a pixel value calculator configured to calculate a second pixel value based on the first pixel value, the predicted pixel value, and the weighting factor,
wherein the known signal content includes at least one deterministic portion of the video signal.

18. The apparatus according to claim 17, wherein said noise estimator is configured to estimate a noise variance according to the known signal content.

19. The apparatus according to claim 17, wherein the at least one deterministic portion includes a portion of the video signal that occurs during a vertical blanking interval.

20. The apparatus according to claim 19, wherein the portion of the video signal that occurs during a vertical blanking interval includes a portion of the video signal that occurs during a closed captioning signal.

21. The apparatus according to claim 17, wherein the first pixel value occurs within a first frame of the video signal, and
wherein said motion compensator is configured to produce the predicted pixel value based on at least one pixel value that occurs within a second frame of the video signal that is prior to the first frame.

22. The apparatus according to claim 21, said apparatus comprising:
a inverse telecine mechanism configured to determine whether one among a plurality of sequences of field equalities is present within the video signal; and
a motion estimator configured to select the second frame according to an output of said inverse telecine mechanism.

23. The apparatus according to claim 17, wherein said motion compensator is configured to interpolate the predicted pixel value based on a plurality of pixel values that each occur within a frame of the video signal that is prior to the first frame.

24. The apparatus according to claim 17, wherein said weighting factor calculator is configured to calculate the weighting factor based on a relation between (A) the first pixel value and (B) an average value of a region of the video signal that includes the first pixel value.

25. The apparatus according to claim 17, wherein said weighting factor calculator is configured to calculate the weighting factor based on a distance between the first pixel value and the predicted pixel value.

26. The apparatus according to claim 17, said apparatus comprising a scene change detector configured to detect a scene change within the video signal,
wherein said weighting factor calculator is configured to calculate the weighting factor based on an output of said scene change detector.

27. The apparatus according to claim 17, wherein, for each of a plurality of pixel values of the first frame:
said motion compensator is configured to produce a corresponding predicted pixel value according to a corresponding motion vector and a location of the pixel value; and
said pixel value calculator is configured to calculate a corresponding filtered pixel value based on the pixel value, the corresponding predicted pixel value, and the weighting factor.

28. The apparatus according to claim 27, said apparatus comprising a video encoder configured to encode an image that includes the second pixel value and the plurality of filtered pixel values.

29. The apparatus according to claim 28, wherein said video encoder is configured to encode the image according to a discrete-cosine-transform-based encoding scheme.

30. The apparatus according to claim 28, wherein said apparatus comprises an integrated circuit including said motion compensator, said pixel value calculator, said noise estimator, said weighting factor calculator, and said video encoder.

31. The apparatus according to claim 17, wherein said apparatus comprises an integrated circuit including said motion compensator, said pixel value calculator, said noise estimator, and said weighting factor calculator.

32. An apparatus comprising:
means for obtaining a predicted pixel value according to a motion vector and a location of a first pixel value of the video signal;
means for estimating a noise statistic of the video signal according to a known signal content of the video signal; and
means for calculating a weighting factor based on the estimated noise statistic; and
means for calculating a second pixel value based on the first pixel value, the predicted pixel value, and the weighting factor, and
wherein the known signal content includes at least one deterministic portion of the video signal.

33. The apparatus according to claim 32, wherein said means for estimating a noise statistic is configured to estimate a noise variance according to the known signal content.

34. The apparatus according to claim 32, wherein the at least one deterministic portion includes a portion of the video signal that occurs during a vertical blanking interval.

35. The apparatus according to claim 32, wherein the portion of the video signal that occurs during a vertical blanking interval includes a portion of the video signal that occurs during a closed captioning signal.

36. An apparatus comprising:
a motion compensator configured to produce a predicted pixel value according to a motion vector and a location of a first pixel value of a video signal;
a scene change detection mechanism configured to indicate detection of a scene change within the video signal; and
a pixel value calculator configured to calculate a second pixel value based on the first pixel value, the predicted pixel value, and a weighting factor,
wherein the weighting factor is based on said scene change detection indication.

* * * * *

UNITED STATES PATENT AND TRADEMARK OFFICE
CERTIFICATE OF CORRECTION

PATENT NO. : 7,663,701 B2  Page 1 of 1
APPLICATION NO. : 11/279243
DATED : February 16, 2010
INVENTOR(S) : de Garrido et al.

It is certified that error appears in the above-identified patent and that said Letters Patent is hereby corrected as shown below:

col. 2, l. 17: change "method" to --method M100.-- col. 4, l. 2: change "arg min SAD($v_x$, $v_y$). ($v_x v_y$)" to -- $\underset{(v_x, v_y)}{\arg\min} \text{SAD}(v_x, v_y)$. -- col. 4, ll. 13-14: change "arg min SSE($v_x$, $v_y$). ($v_x,v_y$)" to -- $\underset{(v_x, v_y)}{\arg\min} \text{SSE}(v_x, v_y)$. -- col. 5, l. 30: change "$|H(e^{j\omega})|$" to --$|H(e^{j\omega})|^2$--

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,663,701 B2                              Page 1 of 1
APPLICATION NO.  : 11/279243
DATED            : February 16, 2010
INVENTOR(S)      : de Garrido et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Twenty-eighth Day of December, 2010

David J. Kappos
*Director of the United States Patent and Trademark Office*